3,431,220
PARTICULATE METAL CATALYSTS OBTAINED BY SUPPORT REMOVAL AND A BASE ACTIVATION TREATMENT
John S. Batzold, Westfield, N.J., assignor to Esso Research and Engineering Company, a corporation of Delaware
No Drawing. Filed July 6, 1964, Ser. No. 380,641
U.S. Cl. 252—472      12 Claims
Int. Cl. B01j 11/06

ABSTRACT OF THE DISCLOSURE

Finely divided active catalysts produced by incorporating salts of noble metals, transition metals lanthanide series metals or mixtures thereof onto a support such as silica, alumina, calcium carbonate, ammonium carbonate, and ammonium oxalate; reducing the metal ions of said salts on the support, and removing the support to produce the finely divided catalysts. A strong base preferably a metal alkali base is used to remove the support, or is used subsequent to the removal of the support, and acts to enhance the activity of the finely divided catalysts.

---

This invention relates to a method of making finely divided catalysts and to such finely divided catalysts. In particular, this invention relates to a method of making finely divided catalysts which are in a highly active state. More particularly, this invention relates to a method of making finely divided active catalysts which comprises supporting a metal salt or metal salts upon a support and subsequently reducing the ions of the metal salt.

Heretofore in the art, finely divided catalysts have been made by a number of different procedures. Finely divided catalysts were made by grinding and pulverizing larger particles, reducing the metal from a salt solution by adding chemical reducing agents such as the alkali metal borohydrides or formaldehyde. The alkali metal borohydrides used heretofore in the art have included primarily the sodium and potassium borohydrides. Also, finely divided metals for use as catalysts have been made by the high temperature reduction of metal salts which comprises treating the metal salt with hydrogen at elevated temperature. These various procedures and known improvements have produced catalysts of varying activity.

It is an object of the present invention to provide a procedure for making finely divided catalytic particles which will be suitable for use as catalytic materials in various chemical reactions. The procedure comprises supporting a metal salt or salts to be reduced upon a support which can be removed without affecting the finely divided catalyst. Preferred supports are silica gel, alumina, calcium carbonate, ammonium oxalate and ammonium carbonate.

The procedure of the instant invention comprises supporting one or more metal salts upon a selected support, reducing the metal of the metal salt by contacting the support with a solution of a chemical reducing agent, preferably potassium or sodium borohydride, removing the support and then collecting the finely divided metal.

The preferred solvents to be used in removing silica gel and alumina supports are the alkali metal hydroxides. In the case of the calcium carbonate, an acid solvent will be required in order to dissolve the support. The ammonium oxalate and ammonium carbonate supports are easily removed by heating to a temperature between 150° to 200° F. or in the case of ammonium carbonate, immersing it in hot water.

The salts in this invention can be reduced by treating the salts with $H_2$ or CO at elevated temperatures, sodium borohydride, potassium borohydride, formaldehyde, formic acid or diborane. The radical anion procedure set forth in U.S. Patent No. 2,177,412 can also be used to reduce the ions.

The finely divided metals produced in accordance with the instant invention are very suitable for use at catalysts in chemical reactions such as hydrogenation, dehydrogenation, anodic oxidation, cathodic reduction, catalysts to facilitate the cracking of hydrocarbons and as initiators and accelerators of chemical reactions.

Catalysts which may be made by the instant invention include finely divided single metals such as the noble metals and the transition metals. Examples of such finely divided metals which can be made by the instant process include platinum, ruthenium, rhodium, palladium, iridium, osmium, rhenium, manganese, chrominum, vanadium, titanium, aluminum, magnesium, molybdenum, tungsten, gold, silver and plumbium and the lanthanide series metals such as cesium, neodymium, samarium, gadolinium, promethium, ytterbium, erbium or combinations of the foregoing noble metals, transition metals and lanthanide series metals. Examples of mixed catalysts are platinum-iridium, platinum-rhodium, platinum-iron-iridium, iron-cobalt, platinum-chromium, platinum-rhenium-vanadium, platinum-gold, gold-iridium and silver-iron. The procedure will also produce finely divided metal catalyst which are not in the zero valence state but are rather in a lower oxidation state. These catalysts include, either singly or in combination, the oxides of the transition base metals and the noble metals. This invention is not directed to any particular catalyst but only to a procedure for producing a more efficient, more active finely divided metal catalyst.

The following examples are submitted for the purpose of illustration only and are not to be construed as a limitation upon the scope of the invention as set forth in the appended claims.

Example

The utility of the instant invention was tested by utilizing a catalyst made according to the instant procedure in a fuel cell as follows:

Ten grams of silica gel were treated with 10 cc. of chloroplatinic acid solution (50 mg. Pt/cc.), made into a paste and dried at 140° F. The dried material was heated to 800° F. under a carbon monoxide atmosphere for 2 hours. The resulting platinum supported on silica was treated with 6 M KOH solution for 24 hours at room temperature and the resulting finely divided black powder washed once with 30% sulfuric acid and three times with water before drying at room temperature under a stream of nitrogen.

Ten grams of silica gel were treated with a mixture of 8 cc. chloroplatinic acid solution (50 mg. Pt/cc.) and 4 cc. of ruthenium chloride solution (25 mg. Ru/cc.) and then treated exactly like the preparation above.

The finely divided catalysts so obtained were mixed with tetrafluoroethylene powder (about 5/1 wt. ratio catalyst to tetrafluoroethylene) and pressed at 10,000 p.s.i. into platinum screens (80 mesh) to form electrodes. Similar electrodes, for comparison purposes, were prepared from commercial platinum black and samples of platinum and platinum-ruthenium reduced chemically at ordinary temperatures (below 122° F.). These electrodes were operated as fuel cell anodes in 30% $H_2SO_4$ at 212° F. using ethane as fuel gas and as fuel cell cathodes in 30% $H_2SO_4$ at 140° F. using air. The results are tabulated in the following tables.

TABLE I.—ETHANE 212° F. 30% $H_2SO_4$

| Catalyst | Polarization from ethane theory at indicated amps/ft.[2] | | | |
|---|---|---|---|---|
| | 0 | 1 | 2 | 5 |
| Platinum reduced on silica, CO, 800° F | | 0.16 | 0.21 | 0.29 |
| Platinum/ruthenium reduced on silica, CO, 800° F | 0.13 | 0.16 | 0.19 | 0.35 |
| Commercial platinum black | 0.05 | 0.16 | 0.20 | 0.33 |
| Platinum reduced by $NaBH_4$ | 0.12 | 0.28 | | |
| Platinum/ruthenium, 2/1, chemically reduced, low temp | 0.10 | 0.16 | 0.22 | |
| Platinum/ruthenium, 4/1, chemically reduced, low temp | 0.17 | 0.19 | 0.26 | |

TABLE II AIR, 30% $H_2SO_4$, 140° F

| Catalyst | Volts polarized from theoretical air at indicated amps/ft.[2] | | | |
|---|---|---|---|---|
| | 0 | 5 | 10 | 20 |
| Platinum reduced on silica, CO, 800° F | 0.23 | 0.37 | 0.44 | 0.57 |
| Platinum/ruthenium, 4/1, reduced on silica, CO, 800° F | 0.25 | 0.43 | 0.47 | 0.55 |
| Commercial platinum black | 0.15 | 0.42 | 0.60 | |
| Platinum reduced by $NaBH_4$ | 0.18 | 0.53 | 0.65 | |
| Platinum/ruthenium, 2/1, chemically reduced, low temp | 0.22 | 0.53 | 0.64 | |
| Platinum/ruthenium, 4/1, chemically reduced, low temp | 0.22 | 0.51 | 0.59 | |

The formation of the catalyst on silica, followed by dissolution of the silica, yields finely divided catalyst in an active form. This is particularly useful for the production of high surface area active alloy catalysts at high temperature since alloys form readily at high temperatures but, in the absence of a support, undergo sintering and loss of surface area.

Example 2

A catalyst made by the instant supported procedure and the prior art procedure were compared as follows:

An active platinum-ruthenium catalyst was prepared on silica by the following technique. Ten grams of silica gel were impregnated by forming a paste with a mixture of, for instance, 8 cc. of chloroplatinic acid solution (50 mg. Pt/cc.) and 4 cc. of ruthenium chloride solution (25 mg. Ru/cc.). After drying, the catalyst was reduced with a solution of sodium borohydride, the silica gel removed by treating with 6 M KOH solution and the resulting finely divided metal washed and dried.

For comparison, a solution of the same composition was reduced with sodium borohydride directly.

Electrodes were prepared from each catalyst by mixing the dried catalyst with 10 wt. percent tetrafluoroethylene and pressing the resulting mixture at 3,000 p.s.i. on a platinum mesh backed by a platinum sheet.

The electrodes were operated in 1M methanol solution in 30% $H_2SO_4$ at 140° F. The catalyst prepared on silica was much more active.

| Catalyst reduced | Polarization at indicated current density | | | |
|---|---|---|---|---|
| | 1 | 10 | 50 | 100 |
| On silica | 0.23 | 0.29 | 0.34 | 0.38 |
| From solution | 0.31 | 0.38 | 0.44 | 0.49 |

A specific interaction can be seen between the silica support and the platinum-ruthenium catalyst which improves markedly the performance of the catalyst. Other interactions between specific supports, i.e., alumina, nickel and other metals and inorganic compounds with other catalysts and catalyst mixtures are also expected.

Example 3

Other catalysts were prepared by the procedure of the instant invention as follows:

(a) Silica gel was treated with a mixture of platinum-rhenium salts and then dried at about 149° F. The dried material was then heated to 800° F. under a CO atmosphere for 2 hours. The resulting catalyst supported on silica was treated with 6 M NaOH for about 20 hours at ambient temperature. The resulting finely divided metal powder was washed with 30% $H_2SO_4$ and three times with water and methanol and then dried at ambient temperature under an inert atmosphere.

(b) A platinum-rhenium-ruthenium catalyst was made in accordance with the procedure of (a) above except that platinum, ruthenium and rhenium salts were substituted for the metal salts of (a).

(c) A platinum-ruthenium catalyst was made by substituting platinum and ruthenium salts for salts of procedure (a).

(d) A platinum-gold catalyst was made by substituting platinum and gold salts for the salts of part (a).

(e) A silver catalyst was made by substituting a silver salt for the salts of part (a).

(f) A nickel catalyst was made by substituting a nickel salt for the salts of part (a).

(g) Catalysts were made by the procedures of the foregoing (a) through (f) by substituting alumina for the silica.

The catalysts prepared by the procedures (a) through (f) are active catalysts.

Example 4

A number of catalysts were made according to the instant procedure and tested and found to be active as catalysts. The catalysts were made as follows:

(a) Ten grams of silica gel were treated with a mixture of 8 cc. chloroplatinic acid and 4 cc. of rhenium chloride solution. The silica gel was then treated with an aqueous solution of potassium borohydride. The silica was then dissolved with NaOH. The resulting metal powder was washed with $H_2SO_4$ and water and then air dried.

(b) Ten grams of silica gel were treated with a mixture of 8 cc. chloroplatinic acid solution and 4 cc. of iridium chloride solution. The silica gel was then contacted with an aqueous solution of sodium borohydride and then the silica was dissolved by using 6 M KOH. The metal was then acid washed, washed with water and then air dried.

(c) Two catalysts were made in accordance with procedures (a) and (b) above except that alumina was used as the support in place of the silica.

(d) Silica gel was saturated with a mixture of chloroplatinic acid and ruthenium chloride salt solution and dried. The silica gel was then treated with a nonaqueous formaldehyde solution in order to reduce the metal ions of the salts. The silica was then dissolved with 6 M KOH. The catalyst was acid and water washed and air dried.

Example 5

A platinum-ruthenium catalyst was made using calcium carbonate as a support. Platinum-ruthenium on calcium carbonate was reduced by $NaBH_4$ and by $H_2$ at 500° F. The carbonate support allows for much faster removal of the support using $HNO_3$. Both catalysts performed poorly before KOH activation and both improved on treatment with KOH. The final performance of the borohydride catalyst was as good as the best previous platinum-ruthenium catalyst prepared by other methods.

TABLE III

| Reduction | KOH activation | Catalyst loading, mg./cm.[2] | Polarization from MeOH theory at indicated ma./cm.[2] | | | |
|---|---|---|---|---|---|---|
| | | | 1 | 10 | 50 | 100 |
| $NaBH_4$ | No | 14 | | 0.44 | 0.55 | |
| | Yes | 14 | 0.23 | 0.28 | 0.32 | 0.35 |
| $H_2$ at 500° F | No | 11 | 0.33 | 0.44 | | |
| | Yes | 11 | | 0.35 | 0.45 | |

The above data indicate the criticality of the alkali metal hydroxide treat.

Example 6

An ammonium carbonate support is saturated with a solution of chloroplatinic acid and iridium chloride and dried. The metal ions are reduced with a solution of $KBH_4$. The support is then mixed with hot water (about 190° F.) until the support is removed. The catalyst is washed in a strong base and then with water.

Example 7

A platinum-rhenium catalyst is made in accordance with the instant invention by contacting finely divided ammonium oxalate as a support with a solution of chloroplatinic acid and rhenium chloride. The ammonium oxalate is then dried and then contacted with a solution of potassium borohydride to reduce the metal ions. The ammonium oxalate is then heated slowly up to about 180° F. and maintained at that temperature until the support is removed. The catalyst is washed in a strong base and then with water. The platinum-rhenium is an active catalyst.

What is claimed is:

1. A method of making a highly active catalyst which comprises contacting a support selected from the group consisting of silica gel and alumina with a salt solution of catalytic metal selected from the group consisting of noble metals, transition metals, lanthanide series metals and mixtures thereof, reducing the catalytic metal ions and subsequently dissolving the support in an alkali metal hydroxide.

2. A method of making a highly active catalyst which comprises contacting calcium carbonate with a salt solution of catalytic metal selected from the group consisting of noble metals, transition metals, lanthanide series metals and mixtures thereof, reducing the catalytic metal ions, dissolving the calcium carbonate with an acid and then treating the reduced metal with an alkali metal hydroxide.

3. A method of making a highly active catalyst which comprises contacting a support selected from the group consisting of ammonium oxalate and ammonium carbonate with a salt solution of catalytic metal selected from the group consisting of noble metals, transition metals, lanthanide series metals and combinations thereof, reducing the catalytic metal ions, heating the support to a temperature between 150° to 200° F. to remove the support and then treating the reduced metal with an alkali metal hydroxide.

4. A method of making a highly active catalyst which comprises contacting silica gel with an aqueous solution of chloroplatinic acid, reducing the metal ions with potassium borohydride and then dissolving the silica gel in potassium hydroxide.

5. A method of making a highly active catalyst which comprises contacting silica gel with an aqueous solution of chloroplatinic acid, heating the silica gel to a temperature of about 800° F. under a carbon monoxide atmosphere and then dissolving the silica gel in sodium hydroxide.

6. A method of making a highly active catalyst which comprises contacting silica gel with a salt solution consisting essentially of chloroplatinic acid, ruthenium chloride and water, reducing the metal ions with sodium borohydride and then dissolving the silica gel with KOH.

7. A method of making a highly active catalyst which comprises contacting silica gel with a solution of platinum and rhenium salts, heating the treated silica gel to a temperature of about 800° F. under a carbon monoxide atmosphere and then dissolving the silica gel with sodium hydroxide thereby providing a finely divided catalyst.

8. A method of making a highly active catalyst which comprises contacting finely divided calcium carbonate with a solution of a mixture of platinum and ruthenium salts, reducing the metal ions with sodium borohydride, dissolving the calcium carbonate with $HNO_3$ and then treating the reduced metal with a KOH solution.

9. A method of making a highly active catalyst which comprises contacting ammonium carbonate with a solution of platinum and iridium salts, reducing the metal ions with potassium borohydride, removing the ammonium carbonate by contacting said carbonate with water at a temperature of about 190° F. and then treating the reduced metal with an alkali metal hydroxide.

10. A method of making a highly active catalyst which comprises contacting finely divided ammonium oxalate with a solution of platinum and rhenium salts, reducing the metal ions on the ammonium oxalate with potassium borohydride, removing the ammonium oxalate by heating gradually up to a temperature of about 180° F. and then treating the reduced metal with an alkali metal hydroxide.

11. A platinum-rhenium catalyst made by contacting a silica gel support with a solution of a mixture of platinum and rhenium salts, reducing the metal ions with sodium borohydride and then removing the support with KOH.

12. A platinum-iridium catalyst made by contacting a silica gel support with a solution of a mixture of platinum and iridium salts, reducing the metal ions with sodium borohydride and then removing the support with KOH.

References Cited

UNITED STATES PATENTS

| | | | |
|---|---|---|---|
| 2,806,004 | 9/1957 | Millikan | 252—412 |
| 3,161,605 | 12/1964 | Beck et al. | 252—460 |
| 3,198,748 | 8/1965 | Keith et al. | 252—443 |
| 3,248,267 | 4/1966 | Langer et al. | 136—120 |
| 3,287,171 | 11/1966 | Holt | 136—86 |
| 3,291,753 | 12/1966 | Thompson | 136—86 |
| 1,686,391 | 10/1929 | Muller et al. | 75—108 |
| 2,004,141 | 6/1935 | Tilley et al. | 252—472 X |
| 2,254,976 | 9/1941 | Powell | 75—108 X |
| 2,267,753 | 12/1941 | Ruthardt | 252—472 |
| 2,945,757 | 7/1960 | Hoekstra | 75—108 X |
| 2,980,749 | 4/1961 | Broers | 136—86 |
| 3,113,048 | 12/1963 | Thompson | 136—86 |
| 3,134,697 | 5/1964 | Niedrach | 136—86 |
| 3,250,646 | 5/1966 | Hipp | 136—86 |

FOREIGN PATENTS

| | | |
|---|---|---|
| 606,348 | 8/1948 | Great Britain. |
| 738,479 | 12/1932 | France. |

OTHER REFERENCES

Metal Hydrides, Inc., "Sodium Borohydride Potassium Borohydride," Beverly, Mass., 1959, pp. 16 and 17.

DANIEL E. WYMAN, Primary Examiner.

PAUL E. KONOPKA, Assistant Examiner.

U.S. Cl. X.R.

252—461, 462, 467, 469, 470, 471, 474, 477